(12) United States Patent
Porter et al.

(10) Patent No.: US 6,613,864 B1
(45) Date of Patent: Sep. 2, 2003

(54) HIGH TEMPERATURE RESISTANT POLYURETHANE POLYMERS

(75) Inventors: James R. Porter, Lake Jackson, TX (US); Allan James, Croton (CA); Kenneth B. Arnold, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/913,816

(22) PCT Filed: Feb. 23, 2000

(86) PCT No.: PCT/US00/04550

§ 371 (c)(1), (2), (4) Date: Aug. 17, 2001

(87) PCT Pub. No.: WO00/50484

PCT Pub. Date: Aug. 31, 2000

Related U.S. Application Data

(60) Provisional application No. 60/121,502, filed on Feb. 23, 1999.

(51) Int. Cl.⁷ .............................................. C08G 18/08
(52) U.S. Cl. ............................ 528/58; 528/60; 528/61; 528/62; 528/63; 528/59; 528/64; 528/65
(58) Field of Search ...................................... 528/58–65

(56) References Cited

U.S. PATENT DOCUMENTS

| | | | |
|---|---|---|---|
| 3,169,934 A | | 2/1965 | Dennett et al. |
| 3,274,134 A | | 9/1966 | Ramos |
| 3,634,306 A | | 1/1972 | Schroeder et al. |
| 4,301,110 A | | 11/1981 | Cuscurida et al. |
| 4,374,209 A | | 2/1983 | Rowlands |
| 4,745,170 A | * | 5/1988 | Bushman et al. |
| 5,162,387 A | | 11/1992 | Abel et al. |
| 5,317,076 A | | 5/1994 | Primeaux |

FOREIGN PATENT DOCUMENTS

| WO | 98/58979 | 12/1998 |
|---|---|---|

OTHER PUBLICATIONS

Derwent Abstract; AN 2000–033774; Chugai Shoko KK et al.; JP–11302645A.

* cited by examiner

*Primary Examiner*—Rachel Gorr

(57) ABSTRACT

A polyurethane composition useful for the manufacture of an elastomeric part is provided. The polyurethane composition comprises a polyisocyanate prepolymer and an active hydrogen containing compound, wherein from about 10 to about 60 percent by weight of the composition is a butylene oxide adduct and from about 70 to about 100 percent of the butylene oxide adduct is present in the polyisocyanate prepolymer. A method for preparing a polyurethane polymer from the polyurethane composition is also provided. Also, a method for preparing a polyurethane article from the polyurethane composition is provided.

20 Claims, No Drawings

HIGH TEMPERATURE RESISTANT POLYURETHANE POLYMERS

This application claims the benefit of U.S. Provisional Application 60/121,502, filed Feb. 23, 2000.

FIELD OF THE INVENTION

This invention relates to polyurethane polymers. More particularly, it relates to reaction injection molded (RIM) polyurethane polymers.

DESCRIPTION OF THE PRIOR ART

Polyurethane polymers are useful in a variety of elastomeric applications. In automobile applications, the advantages of replacing metal and other heavy materials with polyurethane materials are well known. For example, these polymers offer lightweight and corrosion resistant alternatives that can significantly affect cost and performance. Suitable automobile applications include fascia and body panels. The manufacture of molded shoe soles is an example of how isocyanate-based polymers are useful for small molding application.

Unfortunately, the use of polyurethane polymers is not always trouble-free. When filled polyurethane articles are exposed to humid conditions and then exposed to high temperatures, they can exhibit surface defects. This is a particular concern with automobile body parts which are subject to temperatures exceeding 350° F. (177° C.). Polyurethane parts containing too much water can exhibit a surface defect known in the automobile industry as blistering.

Blistering occurs when absorbed moisture absorbed interacts with the polymer to produce gas and the gas accumulates in the part to form a gas pocket. If the surface defect is severe, the entire part may be rejected. As a result, there is a loss in raw materials and production efficiency as well as an increase in waste and scrap materials.

Obvious solutions to the blistering problem include avoiding exposure of the polymeric part to humid conditions or high temperatures. Unfortunately these solutions are not always feasible or desirable. Controlling the humidity in every phase of part's production can be expensive. Heat curing can impart desirable properties to polyurethane parts. Heat can aid in curing paint finishes, thereby improving production rates. Additionally, a polyurethane part may be attached to another article that requires high temperature exposure.

An alternative solution to the blistering problem is to introduce hydrophobic segments into the polymeric backbone. U.S. Pat. No. 4,301,110, issued to Cuscurida, et al., teaches preparing RIM elastomers from a poly(oxybutyleneoxyethylene) glycol, an aromatic polyisocyanate, and a chain extending agent. Unfortunately, polyols having secondary hydroxyls can have a reactivity that differs from polyols having primary hydroxyls. This reactivity difference is often undesirable in many applications.

Similarly, U.S. Pat. No. 5,317,076, issued to Primeaux, II, discloses preparation of RIM elastomers from an amine-terminated poly(oxybutyleneoxyethylene) glycol. The amine catalyzes the reaction as well as reacts with the polyisocyanate. While the amine-terminated polyol has improved reactivity in comparison to polyols only having secondary hydroxyls, it will unfortunately have more catalytic activity than polyols having primary hydroxyls.

It is desirable to prepare polyurethane polymers that do not blister upon exposure to humidity followed by exposure to elevated temperatures. But, it is also desirable to prepare polyurethane polymers from formulations having reactivity similar to that of traditional formulations.

SUMMARY OF THE INVENTION

According to the present invention, a polyurethane composition useful for the manufacture of an elastomeric part is provided. The polyurethane composition comprises a polyisocyanate prepolymer and an active hydrogen containing compound, wherein from about 10 to about 60 percent by weight of the composition is a butylene oxide adduct and from about 70 to about 100 percent by weight of the butylene oxide adduct is present in the polyisocyanate prepolymer. A method for preparing a polyurethane polymer from the polyurethane composition is also provided. Also, a method for preparing polyurethane polymer article from the polyurethane composition is provided.

DESCRIPTION OF THE INVENTION

In the preferred embodiment of the present invention, the polyurethane composition comprises a polyisocyanate prepolymer and an active hydrogen containing compound, wherein from about 10 to about 60 percent by weight of the composition is a butylene oxide adduct and from about 70 to about 100 percent by weight of the butylene oxide adduct is present in the polyisocyanate prepolymer. The present invention is useful for preparing polyurethane polymeric parts.

In the present invention, polyurethane polymer can refer to a polyurethane compound, a polyurea compound, or mixtures thereof A polyurethane compound can be obtained by the reaction of a polyol with a polyisocyanate, wherein the polyol is the active hydrogen containing compound. A polyurea compound can be obtained by the reaction of an amine with a polyisocyanate, wherein the amine is the active hydrogen containing compound. A polyurethane compound or polyurea compound can contain both urethane and urea functionality, depending on what compounds are included in the A and/or B-side formulations. For the purposes of the present application, no further distinction will be made herein between the polyurethane compounds and polyurea compounds. The term "polyurethane polymer" will be used generically to describe a polyurethane compound, a polyurea compound, and mixtures thereof.

Suitable polyisocyanate prepolymers have an NCO content of from 5 to 40 weight percent, preferably from 15 to 30 weight percent. These prepolymers are the reaction products of polyisocyanates and active hydrogen containing compounds such as lower molecular weight diols or triols. Primarily, the active hydrogen containing compounds are multivalent and derived mostly from butylene oxide. The polyisocyanate is present in stoichiometric excess so that the prepolymer retains isocyanate functionality.

The polyisocyanate component of the prepolymer of the present invention can be advantageously selected from organic polyisocyanates, modified polyisocyanates, isocyanate-based prepolymers, and mixtures thereof. These can include aliphatic and cycloaliphatic isocyanates, but multifunctional and particularly difunctional aromatic isocyanates are preferred. Preferred are 2,4- and 2,6-toluenediisocyanate (TDI) and the corresponding isomeric mixtures; 4,4'-, 2,4'- and 2,2'-diiphenylmethane-diisocyanate (MDI) and the corresponding isomeric mixtures; mixtures of 4,4'-, 2,4'- and 2,2'-MD1 and polyphenyl polymethylene polyisocyanates (PMDI); and mixtures of PMDI and TDI.

Also useful with the present invention are aliphatic and cycloaliphatic isocyanate compounds such as 1,6-hexamethylene-diisocyanate; 1-isocyanato-3,5,5-trimethyl-1-3-isocyanatomethyl-cyclohexane; 2,4- and 2,6-hexahydrotoluenediisocyanate. The corresponding isomeric mixtures 4,4'-, 2,2'- and 2,4'-dicyclohexylmethanediisocyanate can also be used. Isophorone diisocyanate can also be used with the present invention.

Also advantageously used for the polyisocyanate component of the prepolymer of the present invention are the so-called modified multifuictional isocyanates, that is, products which are obtained through chemical reactions of the above polyisocyanates. Exemplary polyisocyanates contain esters, ureas, biurets, allophanates, carbodiimides, uretonimines, and urethane groups. Polyisocyanates containing carbodiimide groups and/or uretonimine groups having an isocyanate group (NCO) content of from 10 to 40 weight percent, more preferably from 20 to 35 weight percent, can also be used. These include, for example, polyisocyanates based on 4,4'-, 2,4'- and/or 2,2'-MDI and the corresponding isomeric mixtures, 2,4- and/or 2,6-TD1 and the corresponding isomeric mixtures; mixtures of MDI and PMDI and mixtures of TDI and PMDI and/or diphenylmethane diisocyanates.

Even more preferred for use in the present invention are: (i) polyisocyanates having an NCO content of from 8 to 40 weight percent containing carbodiimide groups and/or urethane groups, from 4,4'-MDI or a mixture of 4,4'- and 2,4'-MDI; (ii) prepolymers containing NCO groups, having an NCO content of from 10 to 35 weight percent, based on the weight of the prepolymer, prepared by the reaction of polyoxy-alkylene polyols, having a functionality of preferably from 2 to 4 and a molecular weight of from 800 to 15,000 with 4,4'-diphenyl-methane diisocyanate or with a mixture of 4,4'- and 2,4'-MDI and mixtures of (i) and (ii); and (iii) 2,4- and 2,6-TDI and the corresponding isomeric mixtures.

PMDI in any of its forms can also be used to prepare the polyurethanes of the present invention. In this case it preferably has an equivalent weight between 125 and 300, more preferably from 130 to 240, and an average functionality of greater than 2.

More preferred is an average functionality of from 2.5 to 3.5. The viscosity of the polyisocyanate component is preferably from 25 (0.025 Pa.s) to 5,000 (5 Pa.s) centipoise, but values from 100 (0.100 Pa.s) to 2,000 (2 Pa.s) centipoise at 25° C. are preferred for ease of processing. Similar viscosities are preferred where alternative polyisocyanate components are selected.

With regard to the multivalent active hydrogen compounds that are derived mostly from butylene oxide (hereinafter "BO POLYOL"), they are preferable polyether diols or triols. The BO POLYOL has an equivalent weight of from about 500 to about 2,000 and a molecular weight of from about 1,000 to about 6,000. More preferably, the BO POLYOL has an average functionality of from about 2 to about 3 and a equivalent weight of from about 1,000 to about 1,800.

An initiator is alkoxylated with butylene oxide to produce the BO POLYOL. The butylene oxide may include minor amounts of other alkylene oxides. These polyols can be prepared by any method known to one of ordinary skill in the art of preparing polyether polyols.

The polyisocyanate prepolymer of the present invention can be prepared by any means known to one of ordinary skill in the art of preparing such prepolymers. Preferably, the polyisocyanate component is prepared by mixing a BO POLYOL with a molar excess of polyisocyanate and holding the mixture for three hours at from about 55° C. to about 85° C. until the desired NCO content is reached.

The prepolymer A side of the present invention is mixed with an active hydrogen containing compound B side. The B side can include a polyamine or a polyol.

If the B side includes a polyamine, the polyamine component can be any polyamine or mixture of polyamines, which can be used to prepare a polyurea. The polyamines are amine compounds having two or more isocyanate reactive hydrogens per molecule. Preferably, all of isocyanate reactive hydrogens of the polyamine are amine group hydrogens.

Examples of such polyamines include alkylene polyamines represented by the formula:

where X is —OH or —NH$_2$ and where n has the value of 0 to 5. When X is—NH$_2$, such alkylene polyamines include ethylene diamine, diethylene triamine, triethylene tetramine, tetraethylene pentamine, pentaethylene hexamine, and the like.

Aromatic amines can be used with the present invention as well. Examples of aromatic polyamines include 2,4 and 2,6-toluenediamine, n-aminoethyl-piperazine, m-phenylenediamine. Particularly useful with the present invention are diethyltoluenediamine and di-tert-butyl-toluenediamine, and the like.

A particularly useful group of amines are amines derived from polyoxypropylene diols and triols. Preferably these diamines have the formula:

wherein x is an integer of from 2 to 40, and the triamines have the formula:

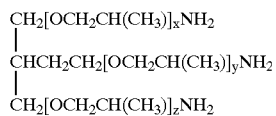

wherein x, y and z represent integers in the range of from 1 to 15, and the sum of x, y and z is from 3 to 50. The most preferred polyoxypropylene diamines have an average molecular weight of from 230 to 2,000. The most preferred polyoxypropylene triamines have an average molecular weight of from 190 to 5,000. Also useful are diamines having the formula:

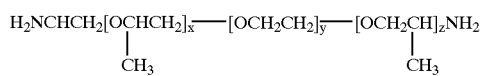

wherein x+z equals 2 to 10 and y is an integer from 1 to 50.

Hydroxyl terminated polyols can also be included in the B side of formulations for the present invention. For example, the polymers of the present invention can be prepared from formulations including polyether or polyester polyols.

Representative polyols suitable for use in the present invention are generally known and are described in such publications as High Polymers, Vol. XVI, "Polyurethanes, Chemistry and Technology" by Saunders and Frisch, Interscience Publishers, New York, Vol. I, pp. 32–42, 44–54

(1962) and Vol. 11, pp. 5–6,198–199 (1964); Organic Polymer Chemistry by K. J. Saunders, Chapman and Hall, London, pp. 323–325 (1973); and Developments in Polyurethanes, Vol. I, J. M. Burst, ed., Applied Science Publishers, pp. 1–76 (1978).

However, any active hydrogen containing compound can be used with the method of this invention. Examples of such materials include those selected from the following classes of compositions, alone or in admixture: (a) alkylene oxide adducts of polyhydroxy-alkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, and mannitol. Preferred herein as alkylene oxide adducts of polyhydroxyalkanes are the ethylene oxide adducts of trihydroxyalkanes. Other useful adducts include ethylene diamine, glycerin, amrnonia, 1,2,3,4-tetrahydroxy butane, fructose, and sucrose.

Also-preferred are poly(oxypropylene) glycols, triols, tetrols and hexols and any of these that are capped with ethylene oxide. These polyols also include poly(oxypropyleneoxyethylene)polyols. The oxyethylene content should preferably comprise less than 80 weight percent of the total and more preferably less than 40 weight percent. The ethylene oxide, when used, can be incorporated in any way along the polymer chain, for example, as internal blocks, terminal blocks, or randomly distributed blocks, or any combination thereof.

Polyisocyanate polyaddition active hydrogen containing compounds (PIPA) can be used with the present invention. PIPA compounds are typically the reaction products of TDI and triethanolamine. A method for preparing PIPA compounds can be found in, for example, U.S. Pat. No. 4,374,209, issued to Rowlands.

Another class of polyols which can be used with the formulations of the present invention are "copolymer polyols", which are base polyols containing stably dispersed polymers such as acrylonitrile-styrene copolymers. Production of these copolymer polyols can be from reaction mixtures comprising a variety of other materials, including, for example, catalysts such as azobisisobutyro-nitrile; copolymer polyol stabilizers; and chain transfer agents such as isopropanol.

In addition to the base polyols described above, other active hydrogen containing materials are useful with the formulations of the present invention. Low molecular weight polyfunctional compounds such as glycols, glycerols, di- and tri-amino compounds, and polyfunctional amino-alcohols can be included in the formulations of the present invention and are particularly useful. For example, ethylene glycol can be used as a chain extender.

In the practice of the present invention, there must be sufficient butylene oxide incorporated into the backbone of the polyurethane polymer to induce high temperature resistance. For purposes of the present invention, high temperature resistance is defined as the ability of a polymer, after first being exposed to moisture and then temperatures of from about 325° F. (163° C.) to about 425° F. (218° C.) for about 1 hour to retain more of its physical properties, such as tensile properties, than conventional polyurethane polymers. High temperature resistance is further defined to include the ability of a polymer to not display surface defects such as blistering when subjected to heat and moisture.

The polymers of the present invention can have sufficient high temperature resistance to allow them to be used in applications such as the electrolytic coating (E-Coat) process used in the manufacture of automobiles. Most conventional polyurethane polymers cannot be used in such processes. Preferably, the polymers of the present invention will lose less than 50% of their tensile properties upon exposure to heat and moisture.

The amount of butylene oxide adducts in the polymers (BOAP) of the present invention is determined by calculating the total weight of the polymer (PWT), the weight of the butylene oxide adducts (BOA) which is represented by the general formula:

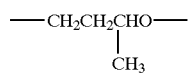

and the using those values in the formula:

(BOA/PWT)×100 =BOAP.

The percent BOAP of the present invention is from about 10 to about 60 weight percent, preferably from about 15 to about 40 weight percent, and more preferably, from about 20 to about 30 weight percent.

In order to achieve the advantageous properties of the polyurethane polymers of the present invention over conventional butylene oxide including polymers, the majority of the butylene oxide adducts is incorporated in the polyisocyanate prepolymer. For the purposes of the present invention, the percent amount of butylene oxide adducts in the prepolymer (BOAPP) can be calculated by determining the total weight of butylene oxide adducts in the polymer (BOAP) and the weight of butylene oxide adducts in the prepolymer (BOAPP) and using those values in the formula:

BOAPP/BOAP×100=weight percent BOAPP.

The weight percent BOAPP is from about 70 to 100 percent, preferably about 80 to about 100 percent, and most preferably about 100 percent.

In addition to the materials already listed, additives can be used with the present invention. Examples of such additives include: surfactants, fillers, mold release agents, and the like. An additive known to one of ordinary skill in the art of preparing polyurethane polymers can be used with formulations of the present invention.

In another embodiment of the present invention, a method for preparing a polyurethane polymer is provided. The method comprises mixing a polyisocyanate prepolymer with an active hydrogen containing compound, wherein from about 10 to about 60 percent by weight of the composition is a butylene oxide adduct and from about 70 to about 100 percent by weight of the butylene oxide adduct is present in the polyisocyanate prepolymer.

In another embodiment of the present invention, a method for preparing a polyurethane polymer article is provided. The method comprises mixing a polyisocyanate prepolymer with an active hydrogen containing compound to form a reactive mixture, injecting the reactive mixture into a mold, reacting the reactive mixture in the mold to form the polyurethane polymer article, and demolding the polyurethane polymer article, wherein from about 10 to about 60 percent by weight of the composition is a butylene oxide adduct and from about 70 to about 100 percent by weight of the butylene oxide adduct is present in the polyisocyanate prepolymer.

The embodiments described herein are given to illustrate the scope and spirit of the present invention. The embodiments will make apparent to those skilled in the art other embodiments that may also be used. These other embodiments are within the scope of the present invention. Thus, the scope of the invention should be determined by the appended claims and their legal equivalents, rather than by the embodiments given herein.

EXAMPLES

The following examples merely exemplify various embodiments of the invention. It is understood that the following examples are provided to further illustrate the invention. They do not in anyway limit the scope of the present invention.

Polyol A has an equivalent weight of 215 and a functionality of about 2. It is a blend of 44.6 parts polyol B, 15.7 parts polyol C, 37.7 parts diethyltoluene diamine (DETDA), 1.57 parts zinc stearate, and 0.1 parts dimethyltin dilaurate catalyst.

Polyol B is prepared from a glycerine initiator, which is propoxylated to a molecular weight of about 4,000 and then ethoxylated to a molecular weight of 5,000.

Polyol C is an aminated propylene oxide polyol having a molecular weight of about 2,000, commercially available as TEXRIM TR-2000*. (*TEXRIM TR-2000 is a trade designation of Huntsmen, Corp.).

Polyol D is a glycerine initiated butylene oxide polyether polyol, having a molecular weight of 5,000.

Prepolymer A is prepared by using 60 parts of a modified polyisocyanate and 40 parts of a 3,000 molecular weight glycerine initiated butylene oxide polyether polyol. The modified polyisocyanate is a eutectic mixture of 4,4'-diphenylmethane diisocyanate and carbodiimide adducts, having an isocyanate equivalent weight of about 144.

Prepolymer B is a conventional prepolymer prepared with 60 parts of the modified polyisocyanate and 40 parts of a 5,000 molecular weight glycerine initiated polyol. The polyol is first propoxylated to a molecular weight of about 4,100 and then ethoxylated to a molecular weight of about 5,000.

Example Nos. 1 and 2

For Example No. 1, a RIM elastomer is prepared using the formulation shown below in Table 1 wherein all of the BO adducts are derived from the prepolymer and the BO adducts are 22.7% by weight of the total polymer weight. For Example No. 2, a RIM elastomer is prepared substantially identically to EXAMPLE 1 except that the elastomer composition does not include BO adducts.

Specimens having dimensions of 4"×4"×0.125"(10.2 cm×10.2 cm×0.32 cm) are cut from plaques having dimensions of 9"×9"×0.125"(22.9 cm×22.9 cm×0.32 cm) prepared using a Sure-Shot 30* RIM machine wherein the A and B sides are held at 110° F. (43° C.) and the mold is held at 160° F. (71° C.). The demold time is 40 seconds.

The plaques are tested for Green Strength by bending a sample over immediately after a specimen is removed from the mold and observing the surface for defects.

After being demolded, plaques are postcured at 285° F. (140° C.) for one hour. The plaques are removed from the postcure oven and allowed to cool to ambient temperature. After cooling, the specimens are submersed in water held at 25° C. The specimens are removed at 24, 48, and 144 hours, dried by wiping, and measured for water weight gain. Specimens are also removed and tested for surface appearance and toughness after 48 hours water soak and exposure to high temperatures for one hour as described in Table 1.

TABLE 1

|  | Ex. No. 1 | Ex. No. 2 |
| --- | --- | --- |
| Polyol A | 43.2 | 44.5 |
| Prepolymer A | 56.8 | — |
| Prepolymer B | — | 55.5 |
| 24 Hour % Weight Gain | 0.7 | 1.6 |
| 48 Hour % Weight Gain | 0.9 | 2.2 |
| 144 Hour % Weight Gain | 1.6 | 3.6 |
| Heat Stab. 360° F. (182° C.) | 0 | 1 |
| Heat Stab. 375° F. (190° C.) | 0 | 2 |
| Heat Stab. 390° F. (199° C.) | 0,3 | 2,3 |
| Green Strength | No defects | No defects |

Heat Stability:
0 - No loss of toughness on doubling over specimen, no surface defects
1 - Some surface crazing/cracking upon the doubling of the specimen
2 - Very brittle, specimen crack before doubling is reached
3 - Less than five minor blisters

Examples Nos. 3–6

For Example Nos. 3–6, RIM elastomers are prepared as in Example 1 using the formulation of Table 2. Some test plaques are cured for 1 hour at 285° F. (140° C.) and other test plaques are cured at 375° F. (190° C.) for 1 hour. Tensile properties are measured according to ASTM D-638, and impact properties are measured according to ASTM D-3763. Plaques are placed in 35° C. water for 24 hours, then wiped dry and tested for water absorption. Then the plaques are placed in a 375° F. (190° C.) oven for one hour, removed, and re-tested as above for tensile and impact properties.

TABLE 2

|  | Ex. No. 3 | Ex. No. 4 | Ex. No. 5 | Ex. No. 6 |
| --- | --- | --- | --- | --- |
| Polyol A | 100 |  | 100 |  |
| Polyol B |  | 62 |  | 62 |
| Polyol C |  |  |  |  |
| DETDA[1] |  | 38 |  | 38 |
| UL-28[2] |  | 0.15 |  | 0.15 |
| Prepolymer A | 133 | 132.5 |  |  |
| Prepolymer B |  |  | 124.7 | 124.3 |
| Green Strength | No Defects | No Defects | No Defects | No Defects |
| 285° F. (140° C.) Post cure |  |  |  |  |
| % Weight Gain | 0.81 | 0.92 | 1.7 | 1.75 |
| Tensile (psi)[3] (kg/sq. cm) | 4640 (326) | 4795 (337) | 3875 (272) | 3890 (273) |
| Impact (J)[3] | 77 | 78 | 76 | 69 |
| Tensile (psi)[4] (kg/sq. cm) | 2971 (209) | 2639 (186) | 1198 (84) | 1452 (102) |
| Impact (J)[4] | 75 | 61 | 2.4 | Too brittle to test |
| 375° F. (190° C.) Post cure |  |  |  |  |
| % Weight Gain | 1.17 | 1.2 | 2.1 | 2.0 |
| Tensile (psi)[3] (kg/sq. cm) | 5010 (352) | 4664 (328) | 4490 (316) | 4410 (310) |

TABLE 2-continued

|  | Ex. No. 3 | Ex. No. 4 | Ex. No. 5 | Ex. No. 6 |
|---|---|---|---|---|
| Impact (J)[3] | 77 | 78 | 69 | 77 |
| Tensile (psi)[4] (kg/sq. cm) | 2614 (184) | 2670 (188) | 1157 (81) | 1173 (82) |
| Impact (J)[4] | 31 | 49 | 1.5 | 4.4 |

[1]Diethyl toluene diamine.
[2]Dimethyltin dilaurate catalyst, available from CK Witco Corporation.
[3]Tested prior to water and heat treatment.
[4]Tested after water and heat treatment.

Example Nos. 7–10

For Example Nos. 7–10, RIM elastomers are prepared and tested substantially as in Example Nos. 3–6. Formulations and results are displayed below in Table 3.

TABLE 3

|  | Ex. No. 7 | Ex. No. 8 | Ex. No. 9 | Ex. No. 10 |
|---|---|---|---|---|
| Polyol C | 63 | 75 | 63 | 75 |
| DETDA[1] | 37 | 25 | 37 | 25 |
| Prepolymer A | 136.6 | 132.5 |  |  |
| Prepolymer B |  |  | 128 | 95.2 |
| Green Strength 285° F. (140° C.) Post cure | No Defects | No Defects | No Defects | No Defects |
| % Weight Gain | 1.04 | 1.17 | 1.52 | 1.81 |
| Tensile (psi)[3] (kg/sq. cm) | 5184 (364) | 3710 (261) | 4604 (324) | 3956 (278) |
| Impact (J)[3] | 78 | 75 | 76 | 78 |
| Tensile (psi)[4] (kg/sq. cm) | 4528 (318) | 2687 (189) | 3450 (243) | 2567 (180) |
| Impact (J)[4] 375° F. (190° C.) Post cure | 77 | 75 | 73 | 58 |
| % Weight Gain | 0.77 | 1.1 | 1.35 | 1.83 |
| Tensile (psi)[3] (kg/sq. cm) | 4696 (330) | 3238 (228) | 4667 (328) | 4088 (287) |
| Impact (J)[3] | 75 | 60 | 77 | 76 |
| Tensile (psi)[4] (kg/sq. cm) | 4296 (302) | 2887 (203) | 2970 (209) | 2403 (169) |
| Impact (J)[4] | 77 | 71 | 75 | 46 |

[1]Diethyl toluene diamine.
[2]Dimethyltin dilaurate catalyst, available from CK Witco Corporation.
[3]Tested prior to water and heat treatment.
[4]Tested after water and heat treatment.

Example Nos. 11–12

For Example No. 11, a RIM elastomer is prepared substantially identically to Example 1, except that polyol B is replaced with 44.6 parts of Polyol D. The part is tested for green strength with cracks and brittleness being observed.

For Example No. 12, a RIM elastomer is made similarly to Example No. 11 except that conditions are optimized to improve green strength. The level of UL-28 is increase by 50 percent, the time until the part is removed from the mold is increased from 40 seconds to 60 seconds, the mold temperature is increased from 160° F. (71° C.) to 195° F.(90° C.), and the temperature of the A and B sides is increased from 110° F. (43° C.) to 135° F. (57° C.). The part is tested for green strength. While it performs better than the part of Example No. 11, it also shows surface crazing. Surface crazing was not exhibited in Example Nos. 1-10.

Example Nos. 13-16

For Example Nos. 13 and 14, RIM elastomers are prepared substantially identically to Example 1. The specimens crack when tested for green strength.

After water and heat treating (as with Example Nos. 3–6), the specimens are too brittle to test.

For Example Nos. 15 and 16, RIM elastomers are made similarly to Example No. 13 except that conditions are optimized to improve green strength. The level of UL-28 is increase by 50 percent, the time until the part is removed from the mold is increased from 40 seconds to 90 seconds and the mold temperature is increased from 160° F. (71° C.) to 195° F. (90° C.).

TABLE 4

|  | Ex. No. 13 | Ex. No. 14 | Ex. No. 15 | Ex. No. 16 |
|---|---|---|---|---|
| Polyol C | 15.7 |  | 15.7 |  |
| Polyol D | 44.6 | 62 | 44.6 | 62 |
| Zinc Stearate | 1.57 |  | 1.57 |  |
| DETDA[1] | 37.7 | 38 | 37.7 | 38 |
| UL-28[2] | 0.1 | 0.15 | 0.15 | 0.225 |
| Prepolymer B | 125 | 125 | 125 | 125 |
| Green Strength | Cracks | Cracks | Cracks | Cracks |

What is claimed is:

1. A polyurethane composition comprises:
   a. a polyisocyanate prepolymer
   b. an active hydrogen containing compound comprising a polyol or polyamine comprising amines derived from polyoxypropylene diols or triols, polyether polyols or polyester polyols, and
   c. a lower molecular weight polyfunctional compound wherein from about 10 to 60 percent by weight of the composition is a butylene oxide adduct and from 70 to about 100 percent by weight of the butylene oxide adduct is present in the polyisocyanate prepolymer.

2. A method for preparing a polyurethane polymer comprising the step of mixing a polyisocyanate prepolymer with an active hydrogen containing compound comprising amines derived from polyoxypropylene diols or tirols, polyether polyols or polyester polyols and a lower molecular weight polyfunctional compound, wherein from about 10 to about 60 percent by weight of the composition is a butylene oxide adduct is present in the polyisocyanate prepolymer.

3. A polyurethane polymer prepared in accordance with claim 2.

4. A method for preparing a polyurethane polymer article comprising
   a) mixing a polyisocyanate prepolymer with an active hydrogen containing compound comprising amines derived from polyoxypropylene diols or triols, polyether polyols or polyester polyols and a lower molecular weight polyfunctional compound to form a reactive mixture;
   b) injecting the reactive mixture into a mold;
   c) reacting the reactive mixture in the mold to form the polyurethane polymer article; and
   d) demolding the polyurethane polymer article,
wherein from about 10 to about 60 percent by weight of the composition is a butylene oxide adduct and from about 70 to about 100 percent by weight of the butylene oxide adduct is present in the polyisocyanate prepolymer.

5. A polyurethane polymer article prepared in accordance with claim 4.

6. A composition according to claim 1 wherein 100 percent of the butylene oxide units in the composition are located in the polyisocyanate prepolymer.

7. A composition according to claim 6 wherein the active hydrogen containing compound is based on poly(oxypropylene) or poly(oxypropyleneoxyethylene) units.

8. The composition of claim 1 wherein the butylene oxide adduct is a butylene oxide polyol derived from butylene oxide, or from butylene oxide and minor amounts of other alkylene oxides.

9. A method according to claim 2 wherein 100 percent of the butylene oxide units in the composition are located in the polyisocyanate prepolymer.

10. The method of claim 9 wherein the active hydrogen containing compound is based on poly(oxypropylene) or poly(oxypropyleneoxyethylene) units.

11. The method of claim 2 wherein the butylene oxided adduct is derived from butylene oxided or butylene oxide and minor amounts of other alkylene oxides.

12. The method according to claim 4 wherein 100 percent of the butylene oxided units in the composition are located in the polyisocyanate prepolymer.

13. The method of claim 12 wherein the active hydrogen containing compound is based on poly(oxypropylene) or poly(oxypropyleneoxyethylene) units.

14. The method according to claim 4 wherein the butylene oxide adduct is derived from butylene oxide or from butylene oxide and minor amounts of other alkylene oxides.

15. The composition of claim 1 wherein the low molecular weight polyfunctional compound is a glycol, glycerol, di- or tri-amino compound, or polyfunctional amino alcohol.

16. The composition of claim 15 wherein the butylene oxide adduct is a butylene oxide polyol derived from butylene oxide.

17. The method of claim 2 wherein the low molecular weight polyfunctional compound is a glycol, glycerol, di- or tri-amino compound, or polyfunctional amino alcohol.

18. The method of claim 17 wherein the butylene oxide adduct is a butylene oxide polyol derived from butylene oxide.

19. The method of claim 4 wherein the low molecular weight polyfunctional compound is a glycol, glycerol, di- or tri-amino compound, or polyfunctional amino alcohol.

20. The method of claim 19 wherein the butylene oxide adduct is a butylene oxide polyol derived from butylene oxide.

* * * * *